United States Patent [19]
Jarrett

[11] 3,970,715
[45] July 20, 1976

[54] THERMOPLASTIC POLYURETHANES MIXED WITH ETHYLENE COPOLYMERS

[75] Inventor: Graham Jarrett, Hitchin, England

[73] Assignee: Imperial Chemical Industries Limited, London, England

[22] Filed: June 21, 1974

[21] Appl. No.: 482,028

[30] Foreign Application Priority Data
July 30, 1973 United Kingdom............... 36137/73

[52] U.S. Cl.............................................. 260/859 R
[51] Int. Cl.² ........................................ C08L 75/04
[58] Field of Search .............................. 260/859 R

[56] References Cited
UNITED STATES PATENTS

| | | | |
|---|---|---|---|
| 3,201,374 | 8/1965 | Simms............................. | 260/80.73 |
| 3,264,272 | 8/1966 | Rees................................ | 260/88.1 R |
| 3,305,503 | 2/1967 | Russell............................ | 260/859 R |
| 3,429,948 | 2/1969 | Massoubre....................... | 260/859 R |
| 3,562,355 | 2/1971 | Holden............................ | 260/859 R |
| 3,646,158 | 2/1972 | Eustice............................ | 260/859 R |
| 3,670,049 | 6/1972 | Stein................................ | 260/859 R |

FOREIGN PATENTS OR APPLICATIONS

| | | | |
|---|---|---|---|
| 45-25379 | 8/1970 | Japan................................ | 260/859 |
| 1,091,200 | 11/1967 | United Kingdom.............. | 260/859 |

*Primary Examiner*—Carman J. Seccuro
*Attorney, Agent, or Firm*—Cushman, Darby & Cushman

[57] ABSTRACT

Compositions comprising soluble and/or thermoplastic polyurethanes mixed with copolymers of ethylene and unsaturated esters of fatty acids show improved resistance to abrasion. Films made from the compositions show a reduced tendency to exhibit blocking. Use of ethylene copolymers mixed with additives also provides a useful way of mixing additives into polyurethanes.

6 Claims, No Drawings

THERMOPLASTIC POLYURETHANES MIXED WITH ETHYLENE COPOLYMERS

This invention relates to compositions comprising soluble and/or thermoplastic polyurethanes mixed with ethylene copolymers.

An account of the chemistry of polyurethanes (alternatively called polyurethans) is given on pages 56 to 106 of volume 21 of the second edition of the "Encyclopedia of Chemical Technology" edited by R. E. Kirk and D. E. Othmer and published by Interscience Encyclopedia. Polyurethanes are usually obtained by reacting an organic di-isocyanate or polyisocyanate with an organic diol or polyol, that is to say organic compounds containing two or more hydroxy groups which are capable of reacting with the di-isocyanate or polyisocyanate to form urethane (or urethan) groups. Most commercially useful polyurethanes are subsequently chain extended by reacting them with so-called "chain extenders" which are usually compounds containing hydroxy or amino groups which are capable of reacting with some or all of any unreacted isocyanate groups remaining in the non-chain extended polyurethane. Examples of organic di-isocyanates include 2,4-tolylene di-isocyanate, 4,4'-diphenylmethane di-isocyanate, dianisidine di-isocyanate, tolidine di-isocyanate, m-xylylene di-isocyanate, hexamethylene di-isocyanate, dimethylenedicyclohexyl di-isocyanate or the methyl or ethyl esters of lysine di-isocyanate. Examples of organic diols include polyethers such as poly(oxypropylene)glycols, poly(oxypropylene-oxyethylene) glycol block copolymers, or poly(1,4-oxybutylene) glycols. Other useful organic diols include polyesters such as the polyesters of adipic acid or phthalic acid with ethylene glycol, propylene glycol, 1,3-butane diol, 1,4-butane diol or copolyesters such as ethylene adipate/tetramethylene adipate copolyesters. Examples of polyols include triols, tetrols and hexols such as the poly(oxypropylene) adducts of trimethyl propane, 1,2,6-hexanetriol or adducts of pentaerythritol or adducts of sorbitol. Other tetrols include the poly(oxypropyleneoxyethylene) adducts of ethylendiamine. Examples of chain extenders include ethylene glycol, 1,4-butane diol, the bis(2-hydroxyethyl)ether of hydroquinone, ethylene diamine, methylene-bis(o-chloroaniline), 1,2,6-hexanetriol or trimethylolpropane all of which are organic compounds containing active hydrogen. In some circumstances water may also be used as a chain extender. Soluble and thermoplastic polyurethanes (including chain extended polyurethanes) are normally made using only difunctional compounds (i.e. di-isocyanates, diols and chain extenders containing only two groups such as hydroxy or amino groups). However they may be made using polyfunctional compounds provided the polyfunctional compounds are not present in amounts which destroy the solubility or thermoplastic nature of the polyurethane obtained.

Many soluble and/or thermoplastic polyurethanes are useful in applications where their ability to resist abrasion is an important property. It has now been found that the abrasion resistance of a soluble and/or thermoplastic polyurethane may often be improved by mixing the polyurethane with certain ethylene copolymers.

Many soluble and/or thermoplastic chain extended polyurethanes can be converted into sheet materials including films and foils. However such sheet materials exhibit what is referred to herein as "blocking". "Blocking" is the tendency of adjacent surfaces of sheet materials to stick together and it is particularly troublesome when film is being unwound from a reel. Blocking can be reduced by mixing anti-blocking agents (e.g. amide derivatives of long chain fatty acids or silicas) into the polyurethane at some stage prior to its conversion into a film. However it has been found that usually as much as 1% by weight (based on the weight of the chain extended polyurethane) of anti-blocking agent is required to achieve even a marginal improvement in the blocking which occurs on reels of film which have been stored for 24 hours. Such a large amount of anti blocking agent is difficult to disperse adequately in a chain extended polyurethane, particularly thermoplastic chain extended polyurethane of high tensile strength since melt mixing techniques such as two roll milling or Banbury milling can only be used with difficulty. The difficulties associated with two roll milling arise primarily from the fact that thermoplastic chain extended polyurethanes tend to have sharp melting points which means they change from a solid to a liquid state very quickly. The difficulties associated with Banbury milling arise from the fact that many thermoplastic chain extended polyurethanes incur an increase in viscosity during Banbury milling.

We have discovered that certain ethylene copolymers can be easily mixed with soluble and/or thermoplastic chain extended polyurethanes including thermoplastic chain extended polyurethanes of high tensile strength. Moreover sheet materials made from these polyurethanes mixed with the ethylene copolymers show a reduced tendency to exhibit blocking.

We have also discovered that mixing soluble and/or thermoplastic chain extended polyurethanes with certain ethylene copolymers containing additives provides a convenient way of mixing the additives with the polyurethane.

Accordingly by this invention we provide a composition comprising a soluble and/or thermoplastic polyurethane mixed with an ethylene copolymer comprising ethylene copolymerised with from 1.7 to 21 mole % of one or more unsaturated esters of a fatty acid wherein the ester contains from 3 to 8 carbon atoms in the molecule. Optionally the ethylene copolymer may also comprise from 0.5 to 10 mole % of one or more unsaturated acids containing from 3 to 7 carbon atoms in the molecule and/or the anhydride of such an acid and/or the salt of such an acid provided that the total amount of ester plus acid, anhydride or salt of the acid does not exceed 21 mole % of the copolymer and provided that the acid, anhydride or salt does not react chemically with the polyurethane to an extent which destroys the useful properties of the polyurethane.

Examples of unsaturated esters of fatty acids include the methyl, ethyl or butyl esters of acrylic or methacrylic acid. However the preferred unsaturated ester is vinyl acetate. It is preferred that the ethylene copolymer should comprise from 4.3 to 11.2 or 13.8 mole % of unsaturated ester. Examples of unsaturated carboxylic acids include acrylic or methacrylic acids. Typical ethylene copolymers comprising copolymerised unsaturated carboxylic acids include a copolymer of ethylene, methyl methacrylate and methacrylic acid or a copolymer of ethylene, methyl methacrylate, vinyl acetate and methacrylic acid.

A soluble polyurethane may be mixed with the ethylene copolymer by stirring or agitating together a solution of the polyurethane and a solution of the ethylene copolymer. It is preferred to choose an ethylene copolymer having a melt flow index such that it is possible to make up a solution of the ethylene copolymer which has a viscosity similar to the viscosity of the solution of the polyurethane. The mixing may be carried out either before or after the chain extending reaction.

A thermoplastic polyurethane may be mixed with the ethylene copolymer by first dry blending granules of the thermoplastic polyurethane with granules of the ethylene copolymer using for example a tumble blender and then melting the dry blend and subjecting the molten blend to light shear as occurs for example when the blend is subjected to the action of a screw extruder. An extruder which is used to complete the mixing of the thermoplastic polyurethane and the ethylene copolymer may form part of apparatus for melt shaping the mixture into articles capable of being made by extrusion moulding such as films or foils or articles capable of being made by injection moulding. Therefore it may be convenient to delay the completion of the mixing operation until a melt shaping operation is to be carried out provided that in the meantime the dry blend is not allowed to separate back into its original components.

Therefore also according to this invention we provide a dry blend of granules of a thermoplastic polyurethane and granules of an ethylene copolymer as hereinbefore specified. Such a dry blend can be converted into a mixture of thermoplastic polyurethane and ethylene copolymer by melting and subjecting to light shear. The granules may be in the form of a fine powder but it is preferred that they be in the shape of spheres, cylinders, cubes or cuboids. Conveniently the longest dimension of a granule may lie in the range 2 to 4 mm.

It is preferred that the melt flow index of an ethylene copolymer intended to be subjected to melting and light shear in the presence of a thermoplastic polyurethane should be such that the flow properties of the molten ethylene copolymer are similar to the flow properties of the molten polyurethane. Conveniently the ethylene copolymer may have a melt flow index in the range 20 to 100 g/10 minutes as measured according to British Standard 2782: Part 1/1050/1970 using a 2.16 Kg load. Melt flow indices in the range 40 to 70 g/10 minutes are particularly suitable.

It is preferred that both the composition comprising a soluble and/or thermoplastic polyurethane mixed with an ethylene copolymer and also the dry blend of granules of a thermoplastic polyurethane and an ethylene copolymer should comprise at least 1% by weight (based on the weight of the mixture or dry blend) of ethylene copolymer if worthwhile improvements in abrasion resistance and resistance to blocking are to be achieved. It is particularly preferred that the mixture or dry blend should comprise at least 2% by weight of ethylene copolymer. Compositions comprising 95% by weight of thermoplastic polyurethane mixed with 5% by weight of ethylene copolymer have been successfully made and it may be possible to make compositions comprising 10% by weight of ethylene copolymer.

The ethylene copolymers may form part of a composition comprising ethylene copolymer and an additive of the kind suitable for melt mixing with an ethylene copolymer. Such additives include additives which are normally added to or considered suitable for adding to polyolefins in general and to low density polyethylene in particular. The additives may be for example stabilisers (such as antioxidants or stabilisers for protection against the effects of ultra-violet light) pigments, fillers, anti-static agents, anti-fogging agents, flame retardants and mould release agents. These additives are usually mixed with polyolefins or ethylene copolymers by melt mixing techniques such as two-roll milling or Banbury milling.

Mixing thermoplastic polyurethanes with compositions comprising ethylene copolymers and additives provides a convenient way of obtaining good mixtures of thermoplastic polyurethanes and additives. Accordingly by this invention we also provide a method of mixing additives with thermoplastic polyurethanes which comprises mixing the thermoplastic polyurethane with a composition comprising an ethylene copolymer as hereinbefore specified and an additive of the kind suitable for adding to an ethylene copolymer. We also provide a composition comprising a thermoplastic polyurethane mixed with a composition comprising an ethylene copolymer as hereinbefore specified and an additive of the kind suitable for adding to an ethylene copolymer.

Soluble and/or thermoplastic polyurethanes particularly useful in the performance of this invention include the polyurethanes disclosed in Dutch patent application 72 04138. These polyurethanes are made by reacting a diisocyanate, e.g. 4,4'-diphenyl methane diisocyanate, with an aliphatic polymeric polyol of molecular weight above 800, e.g. a polyester or polyether such as poly(oxypropylene glycol), poly(ethylene adipate), poly(tetramethylene adipate) or ethylene adipate/tetramethylene adipate copolyester, and then chain extending the reaction product with a diol of molecular weight less than 250, e.g. 1,4-butane diol. Examples of other polymeric polyols, isocyanates and diols are described in aforesaid Dutch Application. The polymeric polyol preferably has a $T_g$ (glass transition temperature) below 0°C.

Films and foils made from the compositions according to this invention may be used in making laminated conveyor belting, laminated food, oil and grease packaging materials and inflatable tent-like structures. They may also be used to make flexible hose and in making cladded metals. Other applications include motor vehicle bumpers (where the film is used to enclose a resilient material such as flexible polyurethane foam), labels, replacements for canvas backing for oil paintings, carbon papers, skid pallets, sterilisable hospital bags, coin bags, electrical insulants, and oil and other chemical flexible seals.

The invention is illustrated by the following Examples.

EXAMPLE 1

In three separate experiments granules of each of the ethylene vinyl acetate copolymer materials specified in Table 1 were tumble blended for 20 minutes with granules of a thermoplastic chain extended polyurethane. The thermoplastic polyurethane had been made by reacting poly(ethylene adipate) of molecular weight 2000 with 6.4 moles per mole of ester, of 4,4'-diphenyl methane diisocyanate at about 135°C, then chain extending the reaction product with a 1% molar excess of 1,4-butane diol and finally drying the chain extended product at 90°C for 4 hours in an oven provided with circulating air currents. The granules of the thermoplastic polyurethane were in the shape of cuboids whose dimensions were approximately 4 by 3 by 3 mms and the granules of ethylene copolymer material were in the shape of cubes whose sides were approximately 3 mms long. The proportions of ethylene vinyl acetate copolymer in the dry blend are also specified in Table 1.

The dry blends obtained were each fed to an extruder. The temperature in the feed zone of the extruder was 175°C rising to 200°C in the region of the die. The die itself was maintained at a temperature of from 200° to 205°C. Film of thickness 0.75 mm was extruded onto a stainless steel drum maintained at ambient temperatures and then wound up onto a reel. The reel of film was stored for 24 hours and then it was unwound from the reel. It was found to unwind easily requiring a force of only about 5 N to separate adjacent surfaces.

A similar film (i.e. made according to Example 1 experiment 3 except that the thermoplastic chain extended polyurethane was not mixed with any ethylene copolymer) required a force 60 N to separate adjacent surfaces of the film after the film had been stored for 24 hours.

TABLE 1

| Experiment | Ethylene Vinyl Acetate Copolymer | Melt Flow Index g/10 minutes | Proportion of Ethylene Vinyl Acetate in Dry Blend |
|---|---|---|---|
| 1 | Comprised 6.8 mole % vinyl acetate | 33 | 2% by weight |
| 2 | Comprised 6.8 mole % vinyl acetate | 10 | 2% by weight |
| 3 | Composition comprising 70% by weight of an ethylene vinyl acetate copolymer comprising 6.8 mole % vinyl acetate and 30% of carbon black. | 33 | 3% by weight |

EXAMPLE 2

Ten samples of film made according to experiment 3 were tested for abrasion resistance of a Taber Abraser. The abraser comprises a horizontal rotatable plate and two abrading wheels mounted above the plate on a common axle which is biassed so as to bring the lowest point of the rim of each wheel into frictional engagement with the plate. Rotation of the plate causes rotation of the wheels. The wheels are positioned 2.75 cms away from the centre of rotation of the plate and arranged so that on rotation of the plate, a common annular path is presented to each wheel.

The samples of film to be tested were each placed in turn between the plate and the wheels so that on rotation of the plate, the wheels began to wear an annular pathway in the upper surfaces of the film. Tabar H-10 abrading wheels were used and were biassed towards the plate by a 1 Kg load. The plate was rotated at a rate of one revolution per second. The loss of weight of the samples was determined at intervals of about 5000 revolutions and the average of the losses of weight for all the samples is given in Table 2a.

TABLE 2a

| Average loss of weight of the Samples in g | | | |
|---|---|---|---|
| After 5000 revolutions | After 10000 revolutions | After 15500 revolutions | After 20000 revolutions |
| 0.046 | 0.080 | 0.110 | 0.134 |

For the purpose of comparison, the test was repeated on ten samples of film made according to Example 1 except that the thermoplastic polyurethane was not mixed with an ethylene copolymer. The average losses of weight of the samples after various numbers of revolutions was measured and the results are shown in Table 2b.

TABLE 2b

| Average loss of weight of Comparative Samples in g | | | |
|---|---|---|---|
| After 5500 revolutions | After 10000 revolutions | After 20500 revolutions | After 25000 revolutions |
| 0.054 | 0.086 | 0.216 | 0.240 |

A comparison of Tables 2a and 2b shows that the presence of ethylene vinyl acetate copolymer improves the abrasion resistance of the polyurethane.

EXAMPLE 3

The tensile properties at break and the tear propagation resistance of films made according to Example 1 experiment 3 were measured and are set out in Table 3. The properties were measured in the machine (i.e. longitudinal) direction (MD) of the film and in the transverse direction (TD). The film was made by the process described in Example 1 experiment 3. Tensile properties at break were measured according to British Standard 903:Part A2: 1956 using test piece C (but modifying the test speed to 5 cm/min) and the Tear Propagation Resistance was measured according to ASTM test D1938-67. Comparative results obtained from films made in the same way from thermoplastic polyurethane not containing any ethylene vinyl acetate are also shown in Table 3.

TABLE 3

| Polymer | Direction of Test | TENSILE PROPERTIES AT BREAK | | Tear Propagation Resistance N/$\mu$m |
|---|---|---|---|---|
| | | Elongation % | stress MN/m$^2$ | |
| Composition comprising the thermoplastic polyurethane mixed with ethylene vinyl acetate | MD | 400 | 104 | 5.6 × 10$^{-2}$ |
| | TD | 830 | 56 | 10.4 × 10$^{-2}$ |
| Thermoplastic polyurethane alone | MD | 332 | 115 | 8.2 × 10$^{-2}$ |
| | TD | 741 | 59 | 10.2 × 10$^{-2}$ |

Table 3 shows that the presence of ethylene vinyl acetate copolymer does not significantly affect three important properties of the thermoplastic polyurethane.

The organic diols and polyols useful in making polyurethanes preferably have molecular weights in excess of 800. Additional examples of diols are polymers and copolymers of epichlorohydrin, oxycyclobutane or substituted oxycyclobutanes and tetrahydrofuran, and also polyetherthioethers such as the products of the self-condensation of thioglycols or the products of the condensation of thioglycols with glycols and also polyacetals such as the reaction products of formaldehyde, acetaldehyde and butyraldehyde with dihydric alcohols such as propylene glycol, butylene glycols and diethylene glycol. Additional examples of polyester diols include the polyesters of succinic, glutaric, pimelic, suberic, azelaic and sebasic acids with dihydric alcohols. Additional examples of dihydric alcohols include diethylene, dipropylene and trimethylene glycols, neopentyl glycol, pentamethylene glycol and hexamethylene glycol. The acid value of the polyesters should be desirably less than 6 and preferably less than 3. The most preferred polyesters have melting points below 60°C and molecular weights between 1000 and 2500.

An additional method for obtaining a polyurethane mixed with an ethylene copolymer is to add the ethylene copolymer to the reactants used to make the polyurethane. For example cast polyurethanes are sometimes made by the so-called "one-shot" process in which one or more organic di-isocyanates are reacted with one or more organic diols of molecular weight greater than about 500 and optionally one or more chain extenders having a molecular weight of below about 500. This reaction may be carried out in a mould or on the surface of a substrate. In either case a solution or dispersion of the ethylene copolymer may be mixed with one of the reactants or with the mixture of reactants prior to it being poured into the mould or onto the substrate. Alternatively cast polyurethanes may be made by the so-called "two-shot" process in which the di-isocyanate and diols are reacted in advance to form a polyurethane which is subsequently chain extended. Solutions or dispersions of the ethylene-copolymer may be mixed with the reactants used to make the polyurethane or with the chain extender.

Ethylene copolymers may be mixed with so-called "millable" polyurethanes by mixing solutions or dispersions of the ethylene copolymers with the reactants used to make the millable polyurethanes or by mixing the ethylene copolymers during the subsequent processing operations carried out on millable polyurethanes. For example millable polyurethanes are often mixed with cross-linking agents such as formaldehyde generators, sulphur, peroxides or extra di-isocyanates or polyisocyanates using a two-roll mill. The ethylene copolymer may be mixed with the polyurethane during such a milling operation and the ethylene copolymer may be used as an aid in dispersing cross-linking agents such as sulphur or peroxides. Millable polyurethanes are also frequently converted into solutions or dispersions in order that they may be cast into films or spun into threads or used in solvent coating techniques. Solution or dispersions of ethylene copolymers may be mixed with these solutions or dispersions of millable polyurethanes.

Suitable solvents for ethylene vinyl acetate copolymers include toluene and benzene. Many ethylene vinyl acetate copolymers will also dissolve in tetrahydrofuran at temperatures above 30°C and in trichloroethylene at temperatures above 50°C. Most polyurethanes will dissolve in toluene, benzene and trichloroethylene.

I claim:

1. A process for the manufacture of a thermoplastic polyurethane elastomer composition having a reduced tendency to blocking compared with the thermoplastic polyurethane elastomer itself, which comprises forming a thermoplastic polyurethane elastomer of high tensile strength by reacting an organic diisocyanate with an aliphatic polymeric diol of molecular weight greater than 800 and a chain-extending agent which consists of a diol of molecular weight less than 250, the reactants being free from ethylenic unsaturation, and thereafter blending the thermoplastic polyurethane elastomer with from 1 to 5% by weight, based on the polyurethane, of an ethylene copolymer consisting of 98.3 to 79 molar % of ethylene copolymerized with from 1.7 to 21 mole % of an unsaturated ester of a fatty acid, said ester containing from 3 to 8 carbon atoms.

2. A process as claimed in claim 1 wherein the copolymer used is a copolymer consisting of 98.3 to 79 molar % of ethylene units and 1.7 to 21 molar % of vinyl acetate units.

3. A process as claimed in claim 1 which comprises blending together granules of the polyurethane and granules of the ethylene copolymer.

4. A process as claimed in claim 2 wherein the copolymer used is a copolymer consisting of 4.3 to 11.2 molar % of vinyl acetate units and 88.8 to 95.7 molar % of ethylene units.

5. A process as claimed in claim 4 wherein the copolymer used is a copolymer consisting of 6.8 molar % of vinyl acetate units and 93.2 molar % of ethylene units.

6. A process as claimed in claim 2 wherein the polyurethane used is obtained by reacting poly(ethylene adipate) of molecular weight 2000 with 4,4'-diphenylmethane diisocyanate and then chain-extending with 1,4-butanediol.

* * * * *